Sept. 25, 1923.  1,468,655
L. R. YEAGER ET AL
VEHICLE LIGHT
Filed Oct. 27, 1920   2 Sheets-Sheet 1
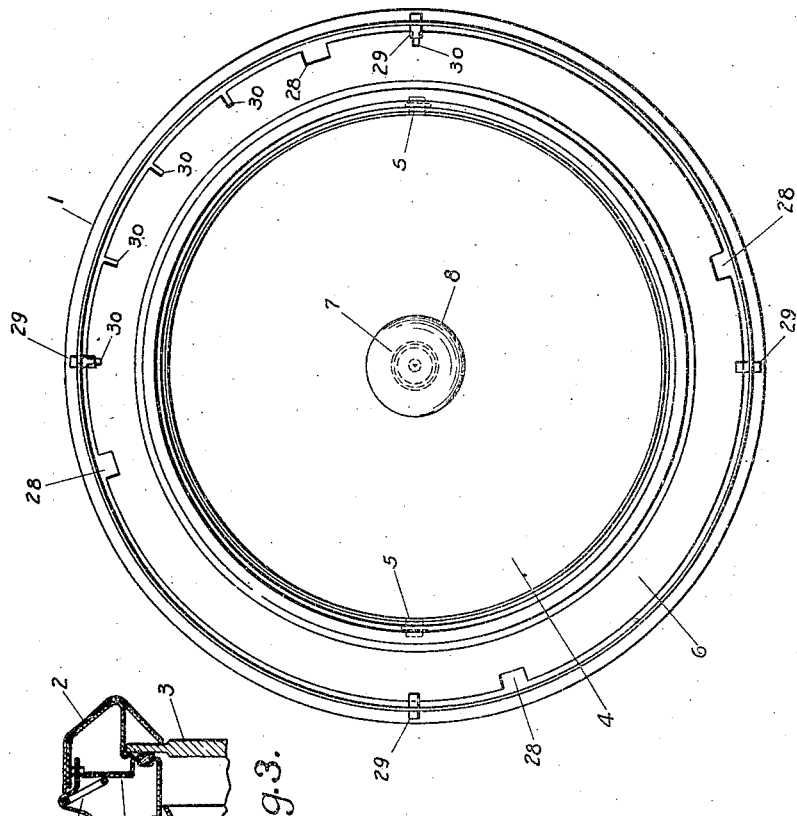
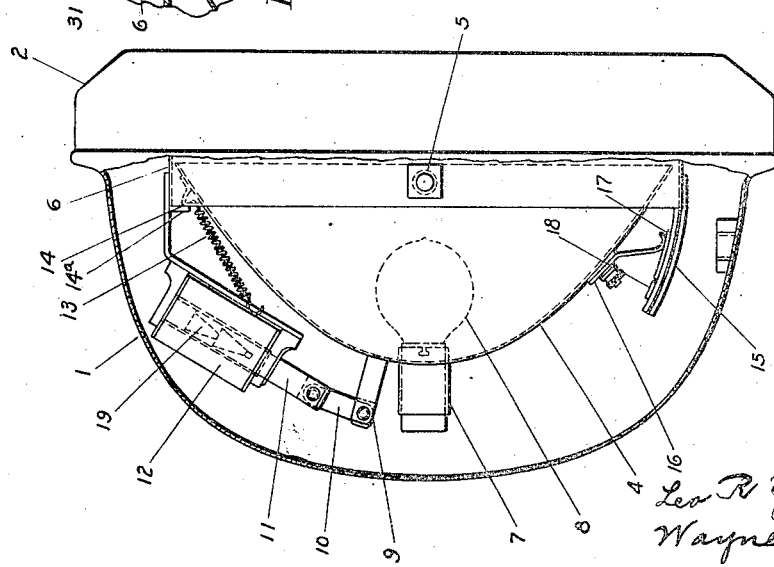
Leo R Yeager
Wayne M. Holmes
INVENTOR
BY
Edwin P. Corbex
ATTORNEY Patented Sept. 25, 1923.

1,468,655

UNITED STATES PATENT OFFICE.

LEO R. YEAGER AND WAYNE M. HOLMES, OF COLUMBUS, OHIO, ASSIGNORS, BY MESNE ASSIGNMENTS, TO SAID YEAGER.

VEHICLE LIGHT.

Application filed October 27, 1920. Serial No. 419,949.

*To all whom it may concern:*

Be it known that we, LEO R. YEAGER and WAYNE M. HOLMES, citizens of the United States of America, residing at Columbus, in the county of Franklin and State of Ohio, have invented certain new and useful Improvements in Vehicle Lights, of which the following is a specification.

Our invention relates to vehicle lights and aims to provide a novel construction of lights for vehicles together with operating mechanism therefor which is of such a nature that the lights may be adjusted under the control of electrical means to different positions and maintained in such adjusted positions electrically.

We have given the matter considerable study and have concluded that the normal difficulties in the way of operating vehicle lights electrically to accomplish adjustments of the nature indicated is the excessive expenditure of current that would arise through the maintenance of adjustment by the same current utilized to effect adjustment. One of the objects of our invention is to obviate this excessive expenditure of current and in one type of apparatus for accomplishing this we have provided such a structure of mechanism for controlling the light that it will be maintained in the position to which it is adjusted merely by the electrical current required for the lamp. To accomplish this, we have provided a means for effecting the actual adjustment of the light by a current which is relatively higher than the current through the lamp and maintaining the adjusted position of the light by the current through the lamp. Our construction is such that the movement of the light into its position of adjustment automatically brings it into subjection to the relatively lower current of the lamp.

A further object of our invention has to do with the provision of a structure of vehicle light and operating mechanism therefor which will serve to tilt the light downwardly from horizontal position, together with a means whereby the beam of light may be thrown to one side or the other.

In preferred form, our results are attained by the provision of a reflector which is mounted upon horizontal trunnions. This reflector is normally held upright by a spring and is designed to be tilted by means of a solenoid. Preferably, the reflector carries a switch-wiper element which is designed to coact with slightly spaced contacts. This switch construction is effective to make and break circuits through the solenoid, the first circuit being completed upon the operation of a manual switch to subject the solenoid to a relatively high current from the batteries and independent of the lamp with the result that the reflector is tilted to throw the light beam downwardly. At the end of this downwardly tilting movement of the reflector the switch-wiper element mentioned passes automatically into cooperative relation with the second contact of the switch with the result that a new circuit is closed with the solenoid in series with the lamp for the maintenance of the reflector in its tilted position.

We have provided a means for adjusting the trunnions which carry the reflector so that, instead of being horizontal, they may be placed at any desired angle in either direction. It will be evident that if these trunnions are moved away from the horizontal position and the reflector is at the same time tilted, the light beam will not only be thrown downwardly but will be thrown to one side or the other, depending upon the direction of adjustment of the trunnions. Thus, the beam of light may be thrown either to the side of the road or more to the center of the road.

The preferred embodiment of our invention is shown in the accompanying drawings wherein similar characters of reference designate corresponding parts and wherein Figure 1 is a vertical cross-section of a standard lamp construction with our attachment applied thereto.

Figure 2 is a front elevation of the structure shown in Figure 1, with the cover and glass removed, illustrating the means whereby the reflector trunnions may be readily adjusted.

Figure 3 is a detail section taken through the rim of our lamp construction.

Figure 4:
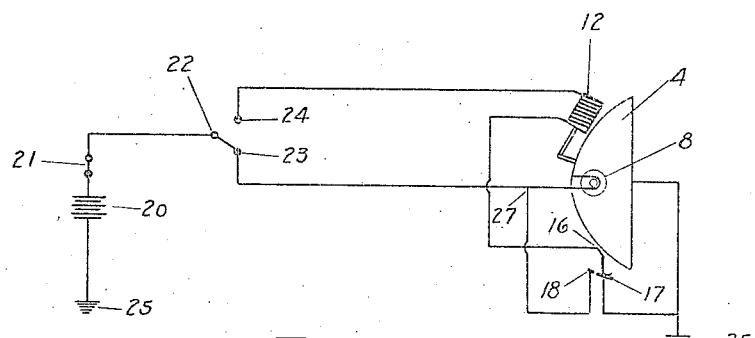
Figure 4 is a diagrammatic illustration of our reflector, the operating solenoid therefor and the circuit when the reflector is being maintained in normal position.

In the drawings, the light is shown as comprising an outer shell or casing 1 having a cover or door 2. This door or cover is adapted to be opened or removed and carries the usual glass or lens 3.

A reflector 4 is pivotally supported by means of the trunnion pins 5 inside of a flanged supporting ring 6. The flanged supporting ring 6 desirably carries all of the elements of my mechanism in such a way that they may be removed as a unit without difficulty.

The reflector shown is provided with the usual lamp socket 7 at its rear center for the reception of an electric lamp 8. The reflector also carries, upon its upper rear surface, a post 9 to the outer end of which is connected a link 10 which is also connected to the core 11 of an electric solenoid 12. This solenoid 12 is desirably carried upon the ring 6 by means of an angular bar, shown in Figure 1.

The reflector is normally held in upright position by means of a coil spring 13 connected at one end to the angular bar which supports the solenoid and at the other end to a protruding lug or stop 14 upon the rear side and near the upper edge of the reflector. The stop 14, when the reflector is in vertical position, is held against a depending pin 14ª upon the angular bar so as to prevent upward tilting by means of the spring 13. This spring also has the effect of preventing any rattling of the parts and taking up all lost motion.

Carried upon the lower side of the ring 6, we have provided an arcuate rearwardly extending member 15 carrying spaced contacts 17 and 18. A switch-wiper 16 is mounted upon the rear of the reflector adjacent its lower edge and is designed to cooperate with the spaced contacts 17 and 18, being insulated from the reflector. The position of the wiper is such that, when the reflector is in normal vertical position, it rests upon contact 17 and when the reflector is in tilted position, this wiper rests upon and makes electrical contact with the second point or contact 18.

By reference to Figure 1 of the drawings, it will be apparent that when the reflector is in normal vertical position, the plunger or core 11 is partly withdrawn from the solenoid 12. Whenever this solenoid is energized, its core is retracted and by this retraction acts through means of the link 10 and post 9 to tilt the reflector about its trunnions so as to direct the beam of light downwardly. The limit of this tilting action is reached when this solenoid core 11 is brought against the core stop 19 of the solenoid. The amount of this tilting may be predetermined by selecting a desired position for the beam of light when thrown downwardly and then regulating the amount of movement allowed the solenoid core. The stop 19 is adjustable to permit of this regulation.

Figure 5:
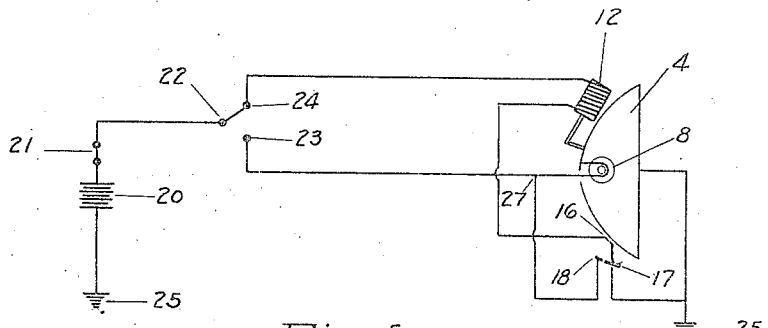
Figure 5 is a similar diagrammatic view illustrating the first connection for tilting, the lamp being shown out of circuit and the solenoid coil being in circuit directly across the battery, with tilting about to occur.
Figure 6:
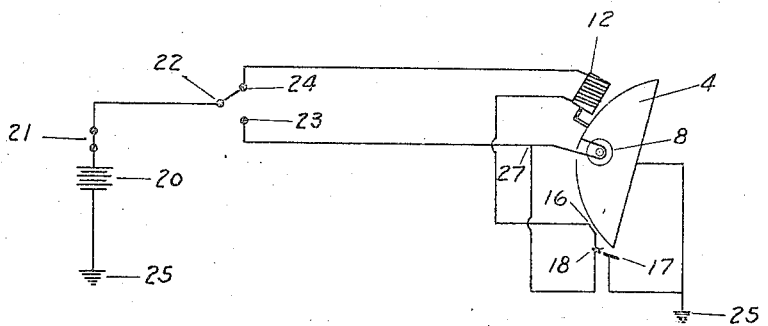
Figure 6 is a diagrammatic view of the structure and circuits shown in Figures 4 and 5 and showing the solenoid coil in series with the lamp for holding the reflector tilted.

The electric circuits and the manner in which they are closed are shown best in Figures 4, 5 and 6. In these figures, the ordinary source of electrical energy is shown at 20 as having one pole electrically connected to a main switch 21 and the other pole electrically connected to the frame of the vehicle or ground 25.

From the main switch 21 electrical connection is made to the movable part 22 of a two-way switch located on the dash or at any other place within easy reach of the driver. This movable part 22 is designed to be actuated manually and to alternately coact with switch points 23 and 24. Point 23 is electrically connected to one terminal of the lamp 8 and, through the common connection 27, to the second contact 18 of the arcuate member 15. Point 24 is electrically connected to one terminal of the solenoid 12.

The other terminal of the solenoid 12 is electrically connected to the insulated wiper 16, while the other terminal of the lamp is electrically connected to the reflector. The reflector, itself, is electrically connected through its trunnions to the vehicle frame or ground 25. The first point 17 of the arcuate member 15 is likewise electrically connected to the vehicle frame or ground. Obviously, an insulated wire may be substituted for the frame or ground connection.

The operation of our device is as follows:
In the normal position of the reflector, as shown in Figure 4, the movable point 22 of the dash-board switch makes contact with the point 23. The closing of the main switch 21 then throws the lamp 8 into circuit to light it. At this time, the solenoid 12 is not connected in circuit.

Upon moving the point 22 over onto the point 24, as shown in Figure 5, the solenoid coil 12 is thrown in circuit with the battery 20 and directly across it by way of switch 21, member 22, point 24, coil 12, contact 17 and the framework or ground. Since the resistance of this coil is low a high current flows through it. This gives a high number of ampere turns with its resultant high magneto motive force so that the flux is high and the pull on the solenoid core 11 a maximum. This pull is sudden and of sufficient force to easily tilt the reflector against the inertia of the various parts and the tension of the spring 13.

During the time this circuit is in effect, the lamp 8 is out of the circuit. The movement of the reflector is so sudden, however, that no dimming of the lamp is apparent, since it is immediately thrown into circuit upon completion of the tilting movement and the resultant establishment of the connections and circuits shown in Figure 6.

As the reflector moves to the tilted position, the wiper 16 moves from the first contact 17 to the second contact 18, as indicated in Figure 6. This makes a circuit through the switch 21 from the battery 20, through the movable switch member 22, contact 24, solenoid 12, wiper 16, through contact 18, through the lamp, and through the reflector to the framework or ground. Thus, the solenoid and the lamp are at this time in series across the source of electrical energy 20. This connection gives a low current, due to the combined resistance of the solenoid and the lamp, a resultant low number of ampere turns, a low magneto motive force and a low magnetic pull. However, this low pull is sufficient to hold the plunger core with its connection and the reflector in tilted position against the weight of the parts and the tension of the spring 13.

It is obvious, of course, that the design of the solenoid coil and the other parts is such that any one skilled in the art can obtain the correct proportion of elements. The resistance of the solenoid is such a small fraction of the resistance of the lamp that the dimming of the lamp due to the increased resistance when the solenoid coil is in series with the lamp is negligible. In fact, the increase of illumination due to the increased proximity to the point of contact of the beam of light with the road will more than compensate for the slight decrease in brilliance of the lamp.

Upon moving the member 22 of the dashboard switch back to point 23 we obtain the condition shown in Figure 4, wherein the lamp is in circuit and the solenoid is out of circuit. In this position, the solenoid has been demagnetized, the plunger core released and the reflector has turned back to its normal position under the influence of the spring 13.

It is obvious that the introduction of the solenoid coil into the circuit and across the battery to series with the lamp may be accomplished by a single switch under the control of the driver's hand, if so desired.

The manner in which the trunnions may be turned away from horizontal position so that the light may be cast downward and to the side when the reflector is tilted, is shown in Figure 2. In this figure it will appear that the flanged support ring 6 is provided with notches 28 about its outer periphery of such a size as to readily slip over the pins 29 fastened into the case 1. Other notches 30 are also provided in the outer periphery of the rim but of such a size that the pins 29 will not quite slip through them. Thus, when mounting the flanged support ring 6 which carries the reflector 4 with its trunnion mountings 5, together with all operating mechanism, it is only necessary to press the flanged support ring 6 against the springs 31 with the notches 28 passing over the pins 29 until the flange is behind the pins, when a slight turn of the ring will cause the flange to pass behind the pins. To more securely hold the ring in place, it is turned until one of the notches 30 engages one of the pins when the ring is constrained to remain fixed through the outward pressure of the springs 31. By bringing pressure on the ring from the front, it can be disengaged from the pins, whereupon it is obvious that the ring with the reflector and the mechanism may be revolved into another position by causing another of slots 30 to engage with the pin 29. It is obvious that the ring with the reflector and the mechanism can thus be revolved into any other position by causing another of slots 30 to engage the pin 29.

This constitutes only a slight departure from the standard construction of lights wherein the ring member in question is normally provided with cutout portions that cooperate with similar pins for maintaining the ring against rotation. We have merely provided more cutout portions than customary so that the ring may be held in a position with the trunnions horizontal or in various positions with the trunnions turned away from horizontal, in either direction. It will be apparent that this structure permits of moving the trunnions away from horizontal so that tilting of the reflector will throw the light downwardly and to the side, in whichever direction desired.

It is important to note that in addition to the features of our invention that have already been set forth, the entire mechanism, being carried by the ring, may be removed as a unit with the ring. In order to facilitate this, it is only necessary to provide the lamp with lead wires of slightly greater than normal length.

Having thus described our invention, what we claim is:

1. In a vehicle lamp, a light source in an electrical circuit, parts adjustable to throw the beam of light in a direction away from horizontal, electrical means for effecting such adjustment, means for positioning said electrical means by a circuit outside the light source, and electrical means for maintaining adjusted position by a circuit through the light source, said last means being automatically rendered effective by the position of said first means.

2. In a vehicle lamp, a light source in an electrical circuit, parts adjustable to throw the beam of light in a direction away from horizontal, an electromagnet for effecting such adjustment, means for operating said electromagnet to effect said adjustment by an electric circuit outside the source of light, and electrical means for maintaining such adjusted position by a circuit through the electromagnet and the source of light.

3. In a vehicle lamp, a light source in an electrical circuit, parts adjustable to throw the beam of light in a direction away from horizontal, an electromagnet for effecting such adjustment, means for operating said electromagnet to effect said adjustment by an electric current outside the source of light, and electrical means for maintaining such adjusted position by a circuit through the electromagnet and the source of light, said last-named means being automatically rendered effective by the operation of said first-named means.

4. In a vehicle lamp, a light source in an electrical circuit, a pivotally mounted reflector, means for normally holding said reflector in vertical position, an electromagnet for tilting said reflector, and means for energizing said electromagnet by a circuit outside the source of light to effect tilting and by a circuit through the source of light to maintain tilted position.

5. In a vehicle lamp, a light source in an electrical circuit, a pivotally mounted reflector, resilient means for normally holding said reflector in vertical position, an electromagnet for tilting said reflector, and means for energizing said electromagnet by a circuit outside the source of light to effect tilting and by a circuit through the source of light to maintain tilted position, and means within the light structure and rendered effective by the tilting of the reflector to throw the electromagnet into a circuit in series with the source of light.

6. In a lamp structure, a light projecting device adjustable to vary the direction of the beam of light, electrical means for adjusting said projecting device by a current of one value and for maintaining adjusted position by a current of a lower value, and means automatically acting to effect the current change indicated when the light projecting device is positioned.

7. In a lamp structure a light source in an electrical circuit, a movable reflector, an electromagnet for moving the reflector when said electromagnet is thrown into an electric circuit independent of the light source, and means for throwing the electromagnet into the light source circuit upon the movement of the reflector.

In testimony whereof we hereby affix our signatures.

LEO R. YEAGER.
WAYNE M. HOLMES.